US008171542B2

(12) United States Patent
Tucker (10) Patent No.: US 8,171,542 B2
(45) Date of Patent: May 1, 2012

(54) ADVANCED ENCRYPTION STANDARD TO PROVIDE HARDWARE KEY INTERFACE

(75) Inventor: James L. Tucker, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 1066 days.

(21) Appl. No.: 11/352,539

(22) Filed: Feb. 13, 2006

(65) Prior Publication Data

US 2007/0192874 A1    Aug. 16, 2007

(51) Int. Cl.
*G06F 21/00*    (2006.01)
(52) U.S. Cl. ............ 726/17; 726/2; 726/3; 726/4; 726/5; 726/27; 726/28; 726/29; 726/30; 713/171; 713/182; 713/183; 713/189; 713/190; 380/274; 380/277; 380/278; 380/279
(58) Field of Classification Search .............. 380/36–37, 380/56–58, 221, 225, 274, 277–279; 713/171, 713/189, 182–186; 726/2–5, 27–30, 16–21, 726/22–25; 715/741
See application file for complete search history.

(56) References Cited

U.S. PATENT DOCUMENTS

| 4,547,738 | A  | * | 10/1985 | Bayer et al. ............... 329/310 |
| 5,426,756 | A  | * | 6/1995  | Shyi et al. ............... 711/159 |
| 6,067,621 | A  | * | 5/2000  | Yu et al. ............... 713/172 |
| 6,366,117 | B1 | * | 4/2002  | Pang et al. ............... 326/38 |
| 6,560,207 | B1 | * | 5/2003  | Kimura et al. ............... 370/324 |
| 6,965,675 | B1 | * | 11/2005 | Trimberger et al. ............ 380/277 |
| 2001/0010080 | A1 | * | 7/2001 | Walter et al. ............... 713/202 |
| 2003/0159036 | A1 | * | 8/2003 | Walmsley et al. ............ 713/168 |
| 2004/0222305 | A1 | * | 11/2004 | Leaming ............... 235/492 |
| 2006/0131691 | A1 | * | 6/2006 | Roozeboom et al. ......... 257/534 |

FOREIGN PATENT DOCUMENTS

EP    1 120 662 A1    1/2001

OTHER PUBLICATIONS

P.Kitsos, 64-bit Block ciphers: hardware implementations and comparison analysis, Nov. 3, 2004, Science direct, Computers and Electrical Engineering 30 (2004) 593-604.*
Hely et al., "Test Control for Secure Scan Designs," Proceedings of the European Test Symposium.
European Search Report for 06123901.8-2212 dated Apr. 17, 2007.
Examination Report from corresponding EP Application No. 06123901.8, dated Dec. 14, 2007, 2 pages.
Reply to communication from the Examining Division, for EP Application No. 06123901.8, dated May 16, 2008, 12 pages.
Examination Report from corresponding EP Application No. 06123901.8, dated Dec. 11, 2008, 4 pages.

* cited by examiner

*Primary Examiner* — Taghi Arani
*Assistant Examiner* — Josnel Jeudy
(74) *Attorney, Agent, or Firm* — Shumaker & Sieffert, P.A.

(57) ABSTRACT

A system to control access to at least one protected device, the system comprising a test access port operable to mate with an external key device and an internal key device that is operable to receive synchronized cipher words during an idle state of the test access port from a removable external key device. The internal key device is also operable to receive test signals via the external key device and to input the received test signals to the protected device based on the synchronized cipher words. The protected device and the internal key device are one of located within a closed chassis, located under a protective security coating, located within a multi-chip-module, located within a closed integrated circuit package, and combinations thereof.

24 Claims, 9 Drawing Sheets

ADVANCED ENCRYPTION STANDARD TO PROVIDE HARDWARE KEY INTERFACE

GOVERNMENT LICENSE RIGHTS

The U.S. Government may have certain rights in the present invention as provided for by the terms of Government Contract # FA8650-04-C-8011 awarded by the USAF.

BACKGROUND

In some applications, a manufacturer or designer of electronics equipment wishes to prevent third parties from reverse engineering such equipment. The manufacturer or designer of electronics equipment often tries to prevent reverse engineering at the unit or system level, the board level, the component level or the chassis level or all of the above.

Some reverse-engineering techniques access electronics by communicating with a housed device using externally accessible interfaces. A debug or test port is typically designed to provide a mechanism by which an external device is able to inspect and change the state of various items of electronics that are internally housed in a chassis, integrated circuit housing and/or a multi-chip-module. For example, an external device can inspect and/or change the state of registers, memory or I/O interfaces of the internally housed device via a debug port or test port. Thus in some cases, a debug port or test port can be exploited to reverse engineer internally housed devices and/or chips.

The electrical systems within manufactured products often include proprietary designs. In some cases the board and/or chip manufacturers integrate the board and/or chip into systems, test the system via a test port and then sell the system to a customer. The test port or debug port is available to the customer that purchased the system.

In other cases, the board and/or chip manufacturers provide customers with a test access port that the customer uses to integrate the board and/or chip into their system. Once the customer has integrated their system, they may sell the system to yet another customer.

To facilitate the test and integration of digital integrated circuits, the Joint Test Access Group (JTAG) has developed the IEEE 1149.1 standard that defines a standard test access port and boundary-scan architecture for digital integrated circuits and for the digital portion of mixed analog/digital integrated circuits. The IEEE 1532 standard extends the IEEE 1149.1 standard to support programmable devices. Both standards provide in-system monitoring of logic states and access of boundary scan addressable memory contents. The capabilities of the JTAG interface port can be used by reverse engineers to probe the chips and boards to obtain the proprietary information about design and/or operation of the probed chips and boards.

If the information that a reverse engineer obtains by reverse engineering proprietary boards and/or chips is related to advanced military applications, the information leak may endanger national security. If the information that a reverse engineer obtains by reverse engineering proprietary boards and/or chips is related to commercial applications, the information leak could be used to undermine the economic security of the commercial vendor.

For the reasons stated above and for other reasons stated below which will become apparent to those skilled in the art upon reading and understanding the specification, there is a need in the art to limit access to proprietary boards and chips via a test access port to authorized personnel.

SUMMARY

One aspect of the present invention provides a system to control access to at least one protected device, the system comprising a test access port operable to mate with an external key device and an internal key device operable to receive synchronized cipher words during an idle state of the test access port from a removable external key device. The internal key device is also operable to receive test signals via the external key device and to input the received test signals to the protected device based on the synchronized cipher words. The protected device and the internal key device are one of located within a closed chassis, located under a protective security coating, located within a multi-chip-module, located within a closed integrated circuit package, and combinations thereof.

Another aspect of the present invention provides a method to control access to at least one protected device through a test access port. The method comprises initiating synchronization of cipher words by communicating a synchronization initiating sequence of data to an internal key device via the test access port, receiving a random word from an internal key device responsive to the synchronization initiating sequence of data, generating synchronized cipher words at the external key responsive to receiving the random word, communicating a current cipher word to the internal key device when a test data input connection of the test access port is idle, communicating test-request data to the internal key device and receiving test-results data communicated from the protected device via the internal key device during one of a shift-IR state or a shift-DR state responsive to communicating the cipher word and the test-request data.

Another aspect of the present invention provides a method to control access to at least one protected device through a joint test access group (JTAG) test access port. The method includes initiating a challenge at an internal key device, receiving a response to the challenge from an external key device, and granting access to the protected device via the joint test access group (JTAG) test access port based on the received response. Initiating the challenge comprises generating a random word at the internal key device, generating synchronized cipher words at the internal key device responsive to generating the random word, communicating the random word to the external key device, and generating synchronized cipher words at the external key responsive to receiving the random word. Receiving the response to the challenge comprises receiving the cipher word generated by the external key device when a test data input connection of a joint test access group (JTAG) test access port is idle and determining the cipher word is authentic. Access is granted to the protected device based on the authentic cipher word.

Yet another aspect of the present invention provides a program product comprising program instructions, embodied on a storage medium. The program instructions are operable to cause a programmable processor to synchronize a generation of cipher words responsive to receiving an initializing sequence and based on a generated random word and a secret password shared with an external key device. The program instructions are also operable to cause a programmable processor to transmit a test-request data to a protected device responsive to the synchronized cipher words and communicate test-results data to the external key device.

Yet another aspect of the present invention provides system to protect a device from unauthorized access. The system comprises means to use a key exchange protocol to determine if test equipment is authorized to access a protected device, means to receive test-results data from the protected device at an internal key device, means to encrypt the test-results data, and means to communicate the encrypted test-results data to an external key device base on the determination.

DRAWINGS

In accordance with common practice, the various described features are not drawn to scale but are drawn to emphasize features relevant to the present invention. Reference characters denote like elements throughout figures and text.

DETAILED DESCRIPTION

Figure 1A:
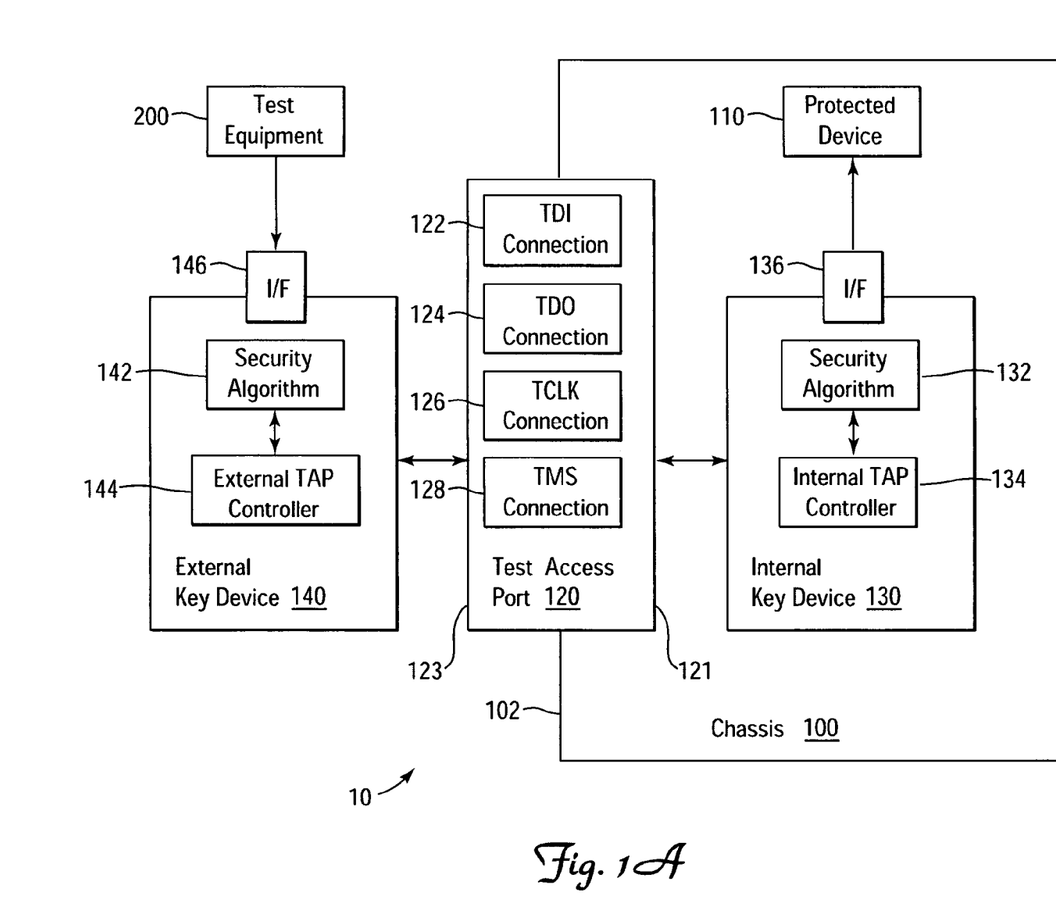
FIGS. 1A-1C are block diagrams illustrating embodiments of a system to control access to a protected device.
Figure 1B:
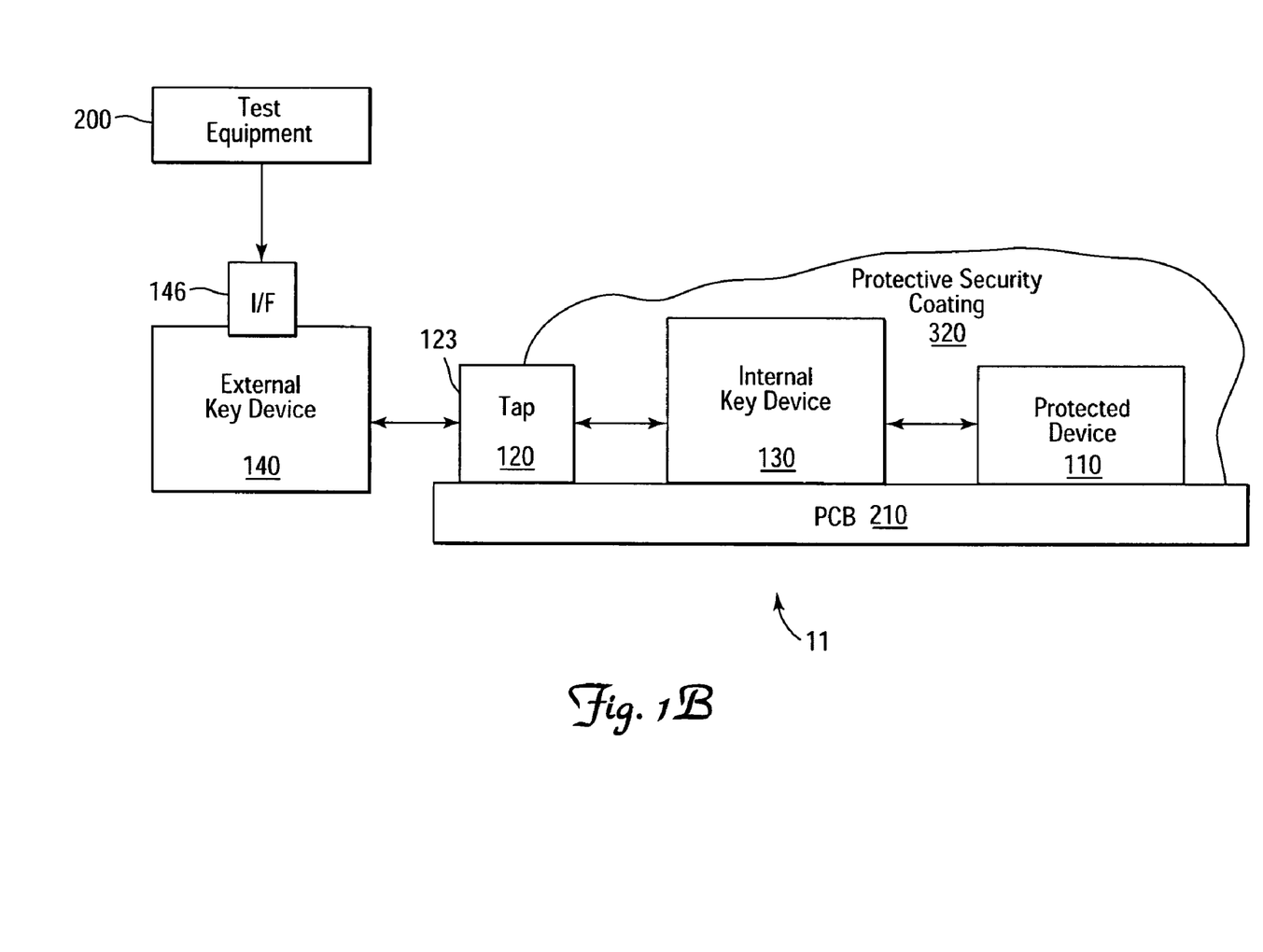
Figure 1C:
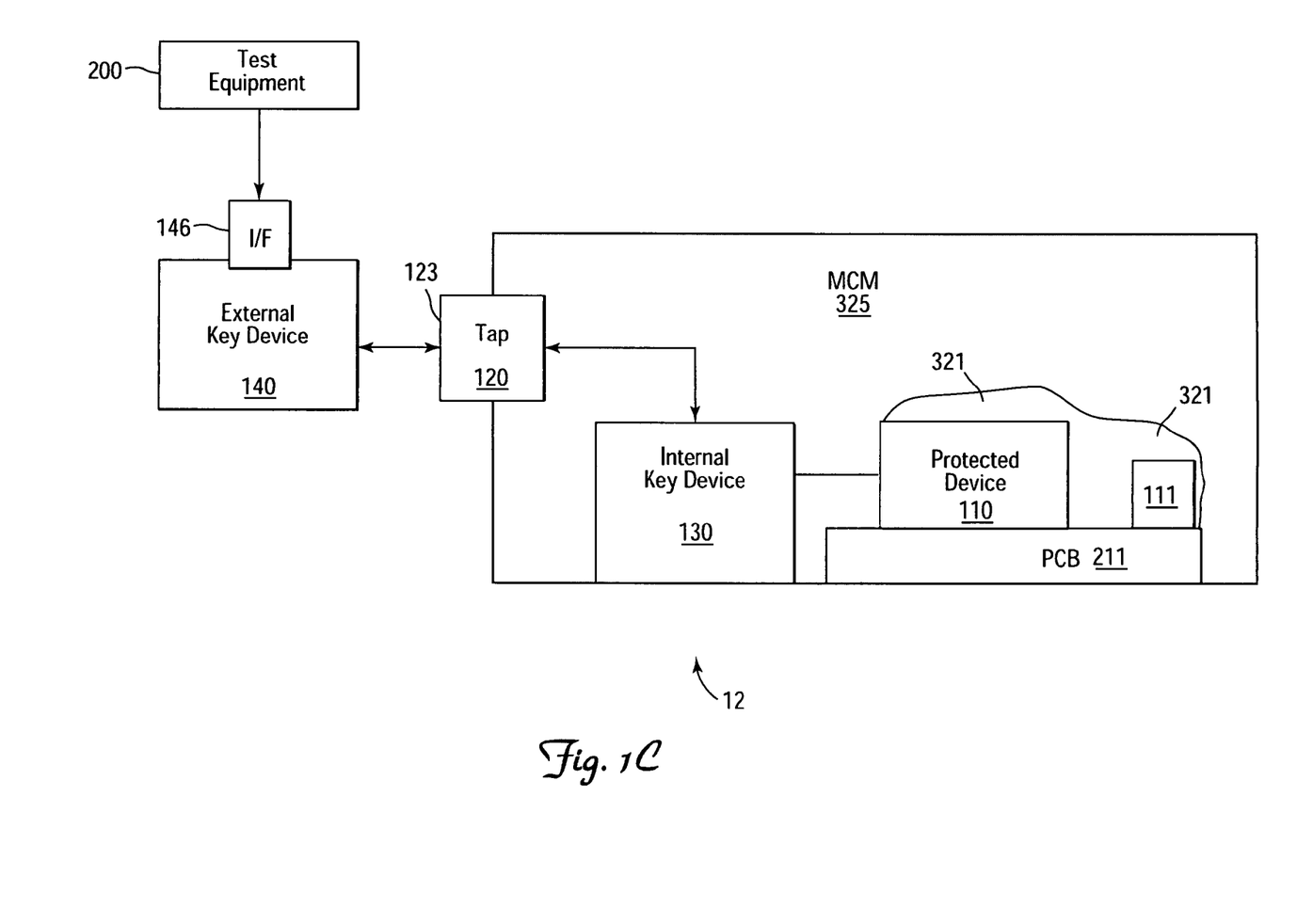

FIGS. 1A-1C are block diagrams illustrating embodiments of a system to control access to a protected device. FIG. 1A is a block diagram illustrating one embodiment of a system 10 to control access to a protected device 110. The system 10 includes an external key device 140, a test access port 120 operable to mate with the external key device and an internal key device 130. The internal key device 130 and the protected device 110 are located within a chassis 100. The test access port 120 extends through a surface 102 of the chassis 100. The test access port 120 has an interior side 121 facing into the chassis 100 and an exterior side 123 facing out of the chassis 100.

The internal key device 130 is communicatively coupled with the test access port 120 from inside the chassis 100 at the interior side 121. The internal key device 130 mates with the test access port 120 at the interior side 121. The internal key device 130 is communicatively coupled with the protected device 110 via interface 136.

The external key device 140 mates with the test access port 120 from outside the chassis 100 at the exterior side 123. The external key device 140 is communicatively coupled with test equipment 200 via interface 146. The test equipment 200 sends test-request data, also referred to here as "test request" or "test signals," to the external key device 140 in order to test the protected device 110.

The external key device 140 includes an external test access port controller 144 and a security algorithm 142 operable to initiate a synchronous cipher word generation with the internal key device 130. The internal key device 130 includes an internal test access port controller 134 and a security algorithm 132 operable to synchronously generate the cipher words with the external key device 140. The security algorithm 142 and security algorithm 132 share a secret password. In one implementation of this embodiment, the secret password is embedded in the security algorithm 142 and security algorithm 132 when they are initially programmed for operation.

The test access port 120 includes: a test clock connection (TCLK) 126 to communicate a clock signal; a test mode select (TMS) connection 128 to communicate a signal enabling a test of the protected device 110 and to control the state of each test access port (TAP) controller; a test data input (TDI) connection 122 to communicate test-request data; a synchronization initiating sequence of data and the cipher words to the internal key device 130; and a test data output (TDO) connection 124 to communicate a random word, test-results data and the cipher words from the internal key device 130. The phrases "encrypted" and "encoded" are used interchangeably within this document. A cipher word includes the internally calculated signal that is exchanged between the external key device 140 and the internal key device 130 in a key exchange protocol. In one implementation of this embodiment, the key exchange protocol is the Advanced Encryption Standard (AES) as specified in FIPS publication 197. In another implementation of this embodiment, the key exchange protocol is a security protocol for encrypting and authenticating communications that is equivalent to the AES.

The internal key device 130 is operable to receive synchronized cipher words from the removable external key device 140 during an idle state of the test access port 120. The internal key device 130 is operable to receive test signals via the external key device 140 during a TDI/TDO active state of the test access port 120. In one implementation of this embodiment, test signals include test-request data including test request signals to initiate a test. The internal key device 130 is operable to input the received test request signals to the protected device 110 based on the synchronized cipher words and the test-request data. In another implementation of this embodiment, test signals include test-results data including test results from a test run on a protected device 110 and test-request data including test request signals to initiate a test.

The external key device 140 is operable to transmit the synchronized cipher words and the test-request data when in electrical communication with the test access port 120 from the exterior side 123. The external key device 140 is operable to send test-results data to test equipment 200 based on the synchronized cipher words and the test-request data.

In one implementation of this embodiment, the protected device 110 comprises a plurality of devices. In another implementation of this embodiment, the protected device 110 comprises a joint test access group (JTAG) chain of devices.

In yet another implementation of this embodiment, test-results data is encoded by the internal key device 130 and sent with a current synchronized cipher word to the external key device 140. In this case, the test-results data is decoded by the external key device 140 after the external key device recognizes the current cipher word as authentic. Then the test-results data is sent from the external key device 140 to the test equipment 200.

In yet another implementation of this embodiment, test-results data are not encoded by the internal key device 130 and the un-encoded test-results data are sent with a current synchronized cipher word to the external key device 140. In this case, the test-results data is sent from the external key device 140 the test equipment 200 after the external key device 140 recognizes the current cipher word as authentic.

In yet another implementation of this embodiment, the test-results data is encoded by the internal key device 130 and sent without a synchronized cipher word to the external key device 140. In this case, the test-results data is decoded by the external key device 140 and sent from the external key device 140 the test equipment 200.

In yet another implementation of this embodiment, the cipher words are generated in parallel and subsequently serialized to be transmitted through the test access port 120. In yet another implementation of this embodiment, the test access port 120 is a joint test access group (JTAG) port or a multiwire serial port. If the test access port 120 is a JTAG port, the test signals are generated by JTAG test equipment 200 and the external key device 140 is communicatively coupled the protected device 110 according to Institute of Electrical and Electronics Engineers (IEEE) 1149.1 standards via the test access port 120. In yet another implementation of this embodiment, the external key device 140 is communicatively coupled to the internal key device according to IEEE 1149.1 standards and IEEE 1532 standards.

The IEEE 1149.1 standard defines test access port and serial communications protocol that allows test instructions and associated test data to be provided to a device, such as protected device 110, and subsequently allows the results of execution of such instructions to be read out. The IEEE 1532 standards describe a series of mandatory and optional programming instructions and associated data registers that extend the capabilities of devices that comply with the IEEE 1149.1 standard in order to define a standard methodology for using the test access port for accessing and configuring programmable devices.

In yet another implementation of this embodiment, the test access port is a JTAG port and the external key device 140 submits an access request to the internal key device 130 after receiving a test request from the user. In response to the access request the internal key device 130 challenges the external key device 140 and only permits access to the protected device 110 after the external key device 140 provides the internal key device 130 with the correct response to the challenge.

FIG. 1B is a block diagram illustrating one embodiment of a system 11 to control access to a protected device 110. The system 11 differs from system 10 of FIG. 1A in the manner of protecting devices. In system 10, the protected device 110 is in a closed chassis 100 secure from tampering or evaluation by unauthorized persons. In system 11, the protected device 110 is covered with an opaque protective security coating 320. The system 11 includes the internal key device 130 covered by an opaque protective security coating 320, the protected device 110 covered by the opaque protective security coating 320, the external key device 140, and the test access port 120. In this implementation of the system 11 shown in FIG. 1B, the protected device 110 is located on a printed circuit board (PCB) 210. The printed circuit board 210 is at least partially covered by the opaque protective security coating 320 so that the protected device 110 is secure from tampering or evaluation by unauthorized persons. An outer surface 123 of the test access port 120 is not covered by the protective security coating 320 and the test access port 120 is thus accessible and operable to mate with external key device 140 at the exterior side 123.

The function, structure and connection of the components of system 11 are the same as the function, structure and connection of the components of system 10 as described above with reference to FIG. 1A.

FIG. 1C illustrates a block diagram of an embodiment of a system 12 to prevent unauthorized access to a protected device in accordance with the present invention. The system 12 differs from system 10 of FIG. 1A and from system 11 of FIG. 1B in the manner of protecting devices. The system 12 includes the internal key device 130, the external key device 140, and the test access port 120. System 12 also includes the protected device, which in the implementation shown in FIG. 1C, is a plurality of protected devices 110 and 111 that are both located on a printed circuit board (PCB) 211 and which are both covered by an opaque protective security coating 321. The protected devices 110 and 111 are secure from tampering or evaluation by unauthorized persons primarily due to being enclosed in the multi-chip-module (MCM) 325 and secondarily due to the opaque protective security coating 321. The outer surface 123 of the test access port 120 is not enclosed in the MCM 325 and the test access port 120 is thus accessible and operable to mate with the external key device 140 at the exterior side 123. In one implementation of this embodiment, the protected devices 110 and 111 are not covered with an opaque protective security coating 320. In another implementation of this embodiment, the MCM 325 is a closed integrated circuit package.

The function, structure and connection of the components of system 12 are the same as the function, structure and connection of the components of system 10 as described above with reference to FIG. 1A.

Figure 2:
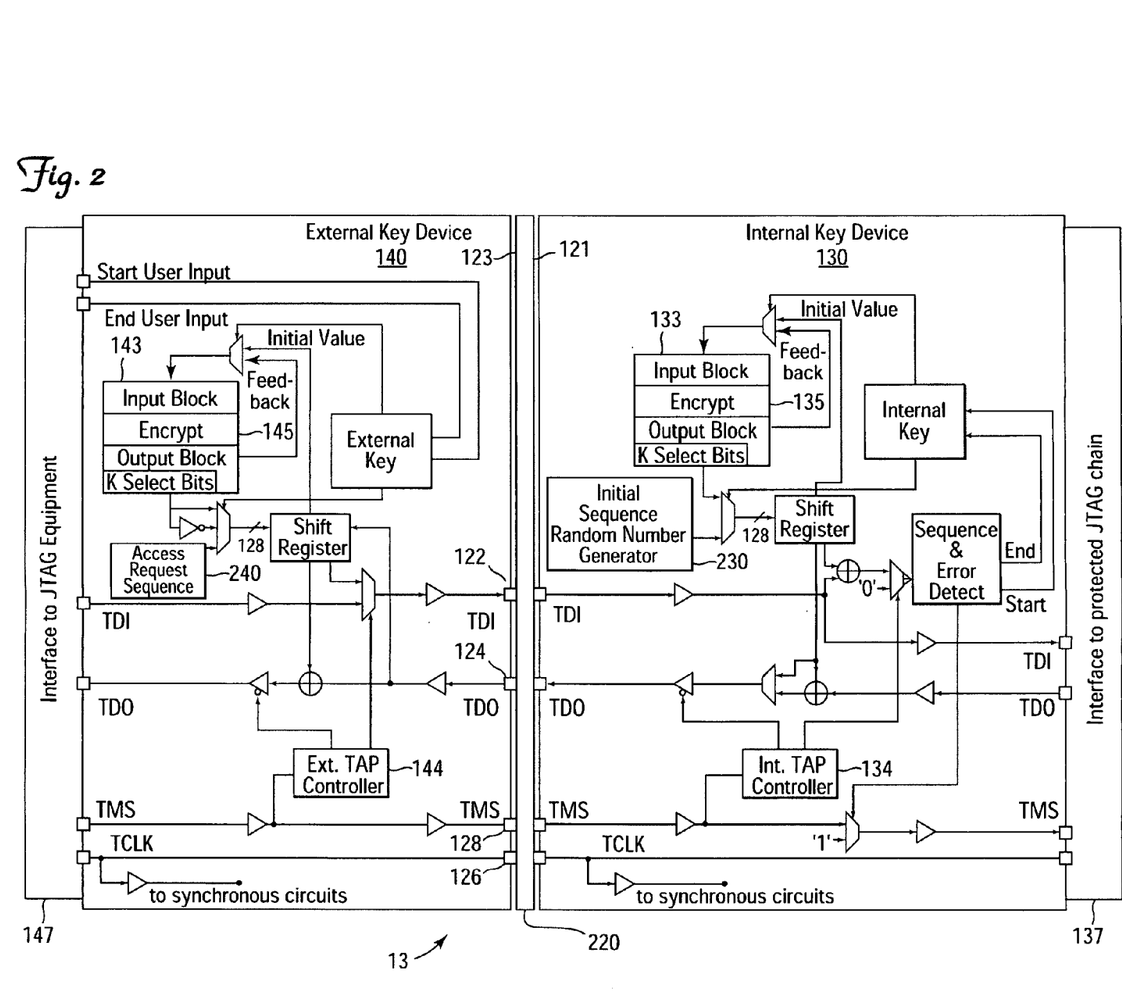
FIG. 2 is a detailed block diagram illustrating one embodiment of a joint test access group (JTAG) system to control access to a protected device.

FIG. 2 is a detailed block diagram illustrating one exemplary embodiment of a system 13 to control access to a protected device. As shown in FIG. 2, the system 13 includes the exterior key device 140 and the internal key device 130 and a test access port 220. The test access port 220 provides communicative coupling between the internal key device 130 and the external key device 140 via the test clock connection (TCLK) 126, the test mode select (TMS) connection 128, the test data input (TDI) connection 122, and the test data output (TDO) connection 124. The exterior key device 140 and the internal key device 130 include the electronic components and circuitry operable to provide the functionality described above with reference to FIG. 1. In this exemplary embodiment, the internal key device 130 is communicatively coupled via interface 137 to protected joint test access group (JTAG) chain. Additionally, the external key device 140 is communicatively coupled via interface 147 to joint test access group (JTAG) equipment. Consequently, JTAG equipment can access the protected JTAG chain via interface 147, external key device 140, test access port 220, internal key device 130 and interface 137 when access is granted by 130.

The exterior key device 140 includes an access request sequence generator 240, an external test access port (TAP) controller 144, an input block 143 and an internal encryption block (Encrypt) 145. The exterior key device 140 is communicatively coupled to synchronous circuits. The internal key device 130 includes an initial sequence random number generator 230, and an internal test access port (TAP) controller 134, an input block 133 and an internal encryption block (Encrypt) 135. The internal encryption block 135 and external encryption block 145 operate in a synchronized manner. During synchronization, the output sequence of the external encryption block 145 is compared to the output of the internal encryption block 135 by the internal key device 130. If the external key device 140 and the internal key device 130 use a matching shared secret password for synchronization, the output sequence of the external encryption block 145 matches the output sequence of the internal encryption block 135. Access to the protected JTAG chain is authenticated by the matching of the output sequences.

A synchronization initiating sequence of data generated by the access request sequence generator 240 is transmitted via the test data input (TDI) connection 122 to the internal key device 130 in order to initiate the synchronization of cipher words. The internal key device 130 responds to the synchronization initiating sequence of data by generating a random word at the initial sequence random number generator 230. The random word was sent to the external key device 140 via TDO connector 124. When, the random word is output from the initial sequence random number generator 230 to the external key device 140, the internal key device 130 begins to generate synchronized cipher words using the random word as a starting point. When the external key device 140 receives the random word, the external key device 140 begins to generate cipher words using the random word as a starting point.

The internal test access port controller 134 and the external test access port controller 144 are implemented in both the internal key device 130 and external key device 140, respectively, to track the states of the test access port (TAP) based on the TMS control signal input. In one implementation of this embodiment, the internal test access port controller 134 and the external test access port controller 144 are implemented in both the respective internal key device 130 and external key device 140 so that the insertion and checking of security data words can be synchronized with JTAG states at each key device.

The internal test access port controller 134 and the external test access port controller 144 also track when the data is valid at the TDI connector 122. Thus, when standard JTAG data is not being sent over the TDI connection 122 or the TDO connection 124, encrypted data is sent instead and checked against the internally generated cipher word to ensure that the security has not been compromised.

The details of the operation of the external key device 140 and the internal key device 130 are outlined below in the flow diagrams 400 and 500 of FIGS. 4 and 5, respectively.

Figure 3:
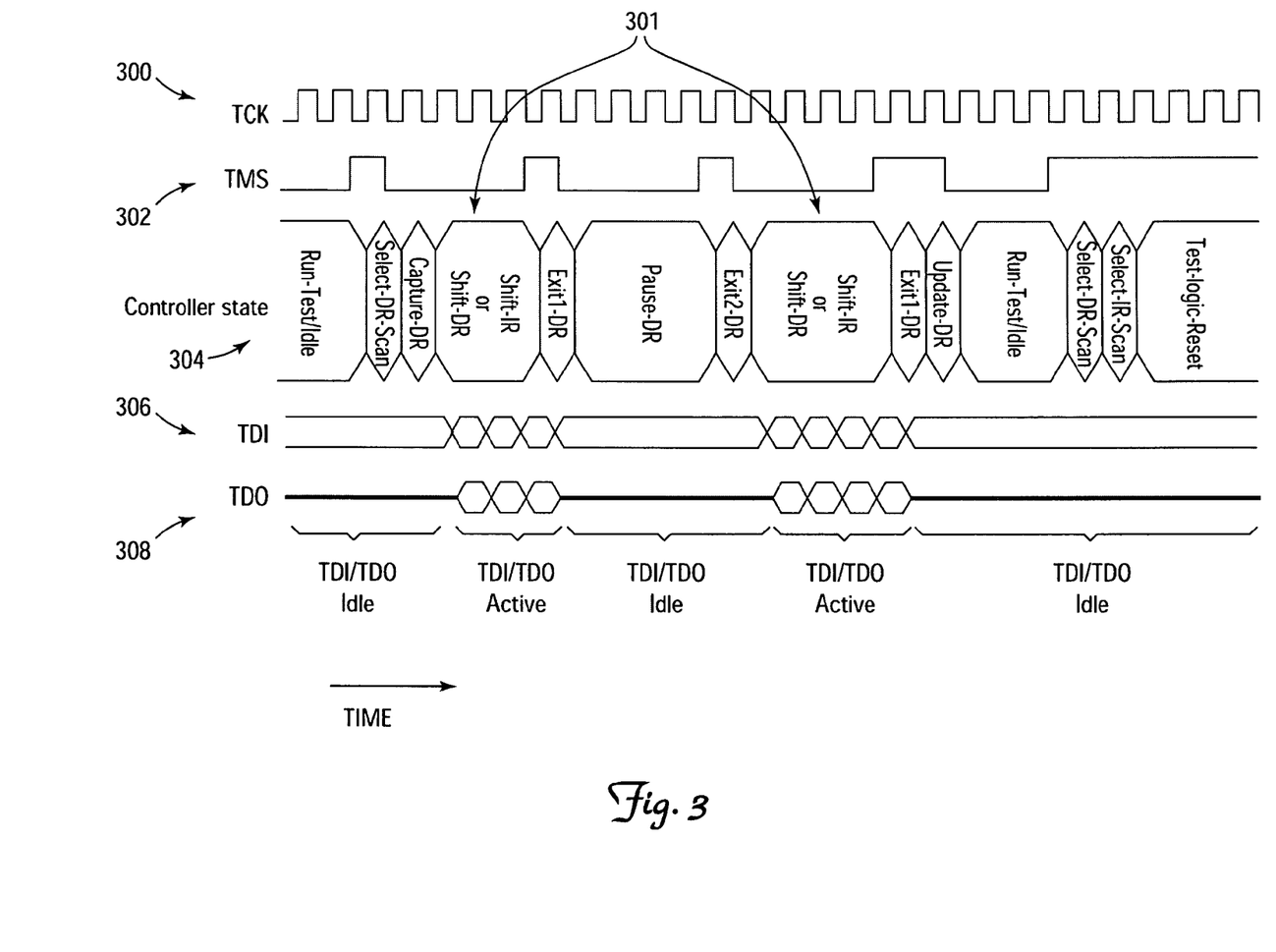
FIG. 3 is exemplary test logic operation data scan for the test access port.

FIG. 3 is exemplary test logic operation data scan for the test access port 120. In FIG. 3, an exemplary test clock (TCK) data scan 300, an exemplary test mode select (TMS) data scan 302, an exemplary controller state 304, an exemplary test data input (TDI) data scan 306 and an exemplary test data output (TDO) data scan 308 are shown for an exemplary time slot. The TDI connection 126 and the TDO connection 124 are idle and not transmitting data during the time ranges generally indicated as "TDI/TDO Idle." The TDI connection 126 and the TDO connection 124 are transmitting test signals during the time ranges generally indicated as "TDI/TDO Active."

The controller state 304 is tracked by the internal test access port controller 134 (FIGS. 1A-1C and 2) as decoded from TMS and TCK signal inputs. The controller state 304 includes a "shift-IR or shift-DR" state 301 during which time data is transmitted on one or both of the TDI connection 122 and the TDO connection 124. Thus, when the controller state 304 is in the "shift-IR or shift-DR" state 301, the test data input (TDI) data scan 306 and the test data output (TDO) data scan 308 are in the "TDI/TDO Active" state. Conversely, when the controller state 304 is not in the "shift-IR or shift-DR" state 301, the test data input (TDI) data scan 306 and the test data output (TDO) data scan 308 are in the "TDI/TDO Idle" state.

In one implementation of the test logic, the internal test access port controller 134 (FIGS. 1A-1C and 2) is subject to the IEEE 1149.1 standards. In such an implementation, all state transitions of the internal test access port controller 134 occur based on the value of the TMS data scan 302 at the time of a rising edge of the TCLK data scan 300. Actions of the test logic, such as instruction register and test data registers, occur on either the rising edge or the falling edge of the test clock data scan 300.

Figure 4:
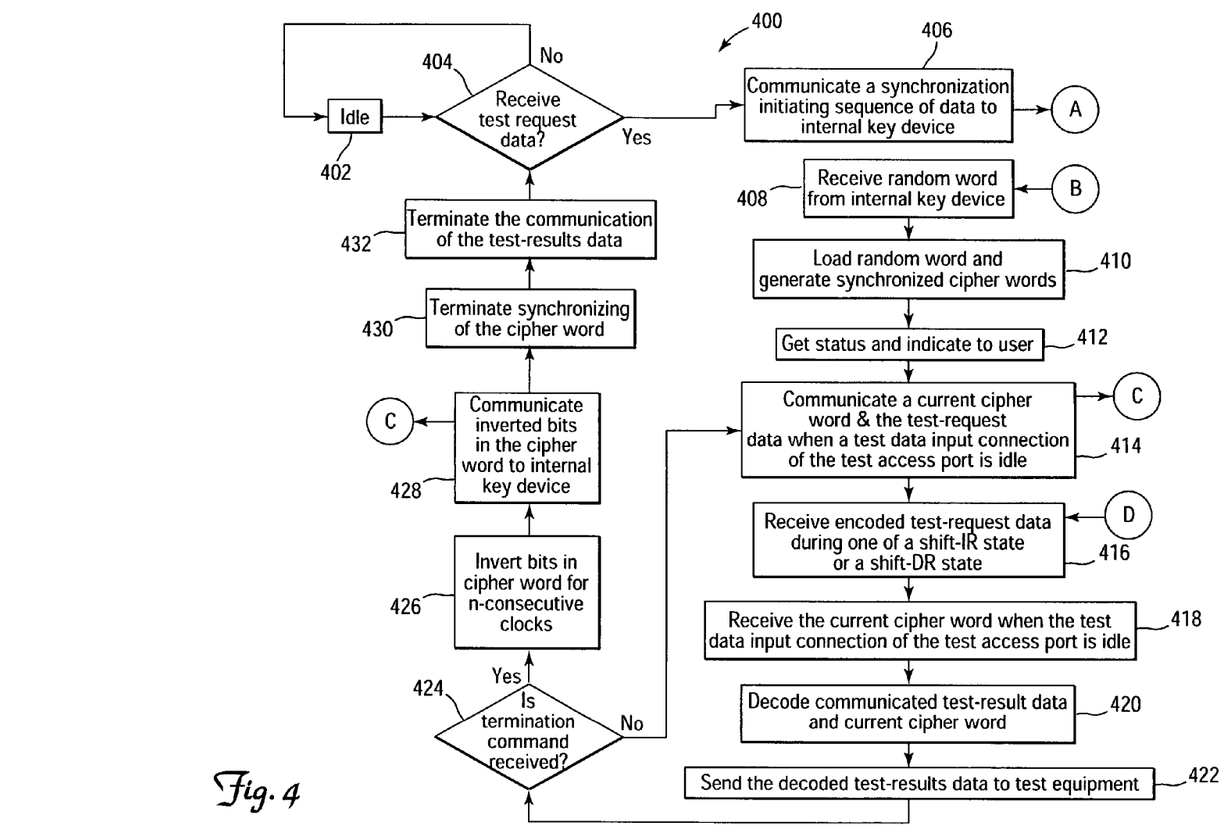
FIG. 4 is a flow diagram of one embodiment of a first portion of a method to control access to a protected device.

FIG. 4 is a flow diagram 400 of one embodiment of a first portion of a method to control access to at least one protected device 110. FIG. 5 is a flow diagram 500 of one embodiment of a second portion of the method to control access to the at least one protected device 110. The first portion of the method to control access to at least one protected device 110 of flow diagram 400 shown in FIG. 4 describes functions performed by the external key device 140. The second portion of the method to control access to the at least one protected device 110 of flow diagram 500 shown in FIG. 5 describes functions performed by the internal key device 130. The first portion and the second portion are compatible so that the combined flow diagrams 400 and 500 provide details of the method for providing test-results from a protected device 110 to authorized test equipment, such as test equipment 200. Likewise, flow diagrams 400 and 500 together provide details of the method for preventing access to the protected device 110 by unauthorized test equipment. Since the flow diagrams 400 and 500 are interactive with each other, the description of the flow diagrams 400 and 500 proceeds according to the interaction which is indicated by alphabetically labeled circles.

The internal key device 130 and the external key device 140 include program instructions, embodied on a storage medium, that are operable to cause a programmable processor to perform the operations described with reference to flow diagrams 400 and 500. In one implementation of this embodiment, the encryption in the methods described in this document is generated by either cipher feedback mode or output feedback mode as described in National Institute of Standards and Technology (NIST) special publication 800-17. In another implementation of this embodiment, the encryption in the methods described in this document is generated by variations of cipher feedback mode or output feedback mode to encrypt and to provide communication between the external key device 140 and the internal key device 130.

At block 402 in FIG. 4, the external key device 140 is in the idle state and is waiting to receive a test-request data input from the test equipment 200. Likewise at block 502 in FIG. 5, the internal key device 130 is in an idle state and is waiting to receive a synchronization initiating sequence of data to initiate synchronization with the external key device 140. At block 404, the external key device 140 determines if test-request data has been received. If it is determined that no test-request data is received, the flow proceeds back to block 402. If it is determined that a test-request data was received from test equipment 200, the flow proceeds to block 406.

At block 406, the external key device 140 initiates synchronization of cipher words. The external key device 140 generates and communicates synchronization initiating sequence of data to the internal key device 130 via the test data input (TDI) connection 122 of test access port 120. The synchronization initiating sequence of data is input to the internal key device 130 when the test data input (TDI) connection 122 is idle or in an idle state generally indicated as "TDI/TDO Idle" in FIG. 3. The flow proceeds to "A" in the flow diagram 500 of FIG. 5.

From "A" the flow proceeds to block 504. At block 504 in FIG. 5, the internal key device 130 determines if the synchronization initiating sequence of data has been received. If it is determined that no synchronization initiating sequence of data is received, the flow proceeds to block 502. If it is determined that the synchronization initiating sequence of data was received from the external key device 140, the flow proceeds to block 506. At block 506, the internal key device 130 generates a random word responsive to receiving the synchronization initiating sequence of data. The random word is output via the TDO connection 124 to the external key device 140 while the TDO connection 124 is in the idle state.

In one implementation of this embodiment, the random word is generated by the initial sequence random number generator 230 shown in FIG. 2.

Figure 5:
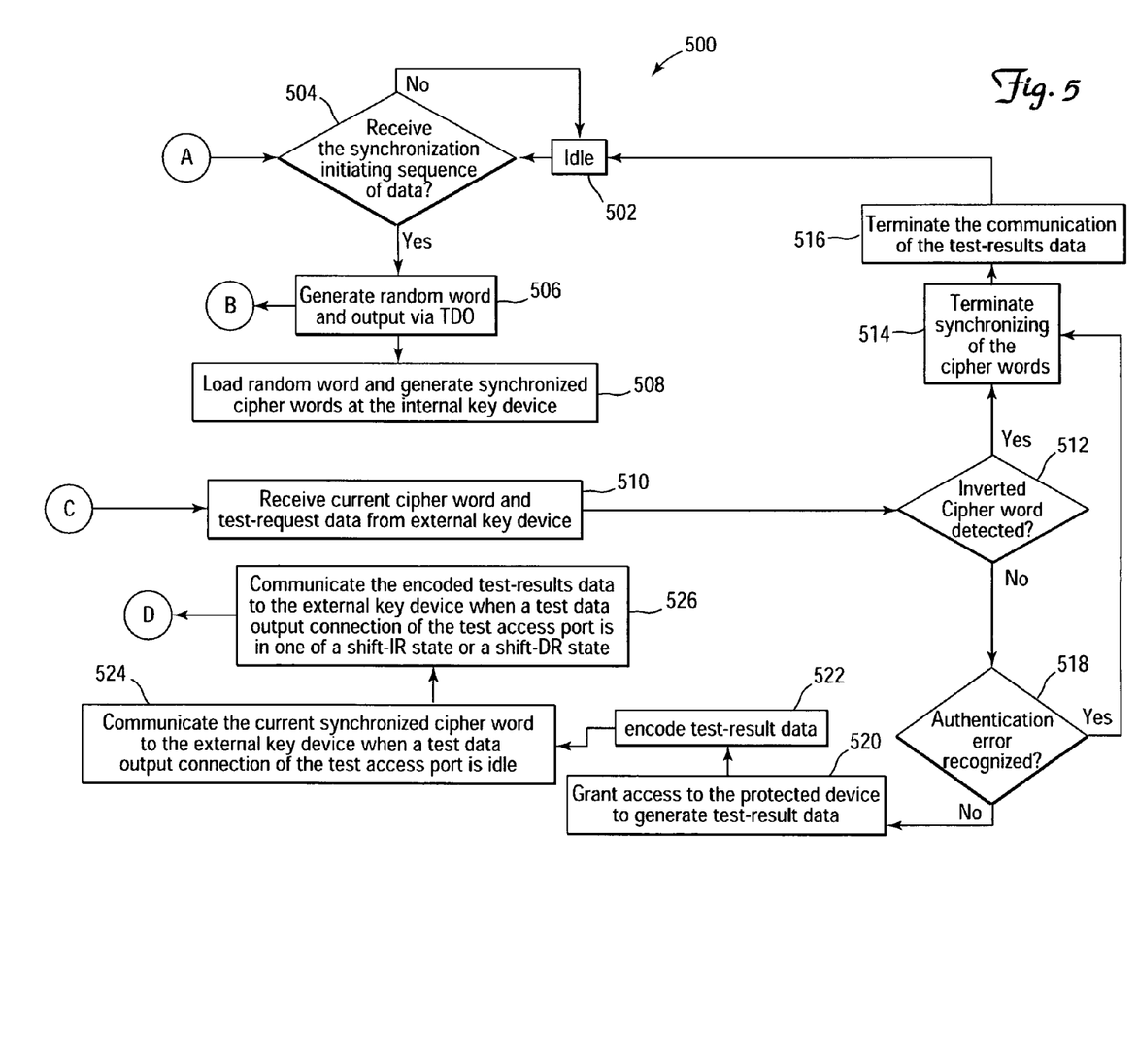
FIG. 5 is a flow diagram of one embodiment of a second portion of the method to control access to a protected device.

The flow proceeds to "B" in the flow diagram 400 of FIG. 4 and to block 508 of FIG. 5. At block 508 in FIG. 5, the internal key device 130 loads the random word and generates synchronized cipher words responsive to the generation and loading of the random word. An Advanced Encryption Standard (AES) algorithm or an equivalent algorithm generates the synchronized random cipher words based on the secret password and the initial random word. The secret password is known at both the internal key device 130 and the external key device 140. In one implementation of this embodiment, the random word is loaded into the input block 133 of the internal key device 130 as shown in FIG. 2.

From "B", the flow proceeds to block 408. At block 408, the external key device 140 received the random word from the internal key device 130. At block 410, the external key device 140 loads the random word and generates synchronized cipher words responsive to receiving and loading the random word. The Advanced Encryption Standard (AES) algorithm or an equivalent algorithm generate the synchronized random cipher words based on the secret password and the initial random word in the same manner as the internal key device 130. In one implementation of this embodiment, the random word is loaded into the input block 143 of the external key device 140 as shown in FIG. 2.

In this manner the cipher words generated in the internal key device 130 and external key device 140 are synchronized to each other. The synchronized cipher words are continuously generated by the encryption circuit blocks 135 and 145 (FIG. 2) in the internal key device 130 and external key device 140, respectively.

In one implementation of this embodiment, the code words are calculated in parallel and then serialized to be applied to the serial data stream of the joint test access group (JTAG) protocol. As referred to herein, the current cipher word is the most recent synchronized cipher word that is simultaneously generated in both the internal key device 130 and external key device 140.

At block 412, the external key device 140 gets the status of the internal key device 130 and the external key device 140 and indicates the status to a user. The external key device 140 initiates a handshake with the internal key device 130 to determine the status of the internal key device 130. During the handshake, the external key device 140 communicates a current cipher word to the internal key device 130 when the test data input (TDI) connection 122 of the test access port 120 is idle. The internal key device 130 receives the cipher word generated by the external key device 140. The internal key device 130 determines if the cipher word is authentic.

In one implementation of this embodiment, an authentication error is recognized when the cipher word received from the external key device 140 is not synchronized with the cipher word generated in the internal key device 130. If an authentication error is recognized by the internal key device 130, the internal key device 130 notifies the external key device 140. Then the external key device 140 indicates that the protected device 110 is not accessible for the test equipment 200 for the given external key device 140. In this case, an exemplary status indication to the user is "NOT READY FOR TEST" or "UNAUTHENTICATED TEST EQUIPMENT," or "UNAUTHENTICATED EXTERNAL KEY DEVICE."

If the internal key device 130 determines the cipher word is authentic, the internal key device 130 notifies the external key device 140. Then the external key device 140 indicates that the protected device 110 is accessible to the test equipment 200 and the flow proceeds to block 414. In one implementation of this embodiment, once the cipher words are being generated, the status is indicated as "READY FOR TEST."

At block 414, the external key device 140 communicates a current cipher word and a test-request data to the internal key device 130 when the test data input (TDI) connection 122 of the test access port 120 is idle. This idle state is generally indicated as "TDI/TDO Idle" in FIG. 3. The flow proceeds to "C" in the flow diagram 500 of FIG. 5. In one implementation of this embodiment, the external key device 140 communicates a current cipher word to the internal key device 130 when the test data input (TDI) connection 122 of the test access port 120 is idle and the external key device 140 communicates a test-request data to the internal key device 130 when the test data input (TDI) connection 122 of the test access port 120 is active.

From "C" the flow proceeds to block 510. At block 510, the internal key device 130 receives the current cipher word and test-request data from the external key device 140. At block 512, the internal key device 130 determines if the received current cipher word is inverted, since an inverted cipher word is an indicator that a termination command was received at the external key device 140. If the internal key device 130 determines that the cipher word is inverted, the flow proceeds to block 514. At block 514, the internal key device 130 terminates synchronizing of the cipher word. At block 516, the internal key device 130 terminates the communication of the test-results data based on the terminating the synchronizing of the cipher words and the flow proceeds to block 502 where the internal key device 130 is in the idle state. In one implementation of this embodiment, the internal device 130 recognizes that an access which ends in an inverted sequence is a "normal" termination.

If the internal key device 130 determines that the cipher word is not inverted, the flow proceeds to block 518. At block 518, the internal key device 130 determines if an authentication error is recognized. In one implementation of this embodiment, an authentication error is recognized when the current cipher word received from the external key device 140 is not synchronized with the current cipher word in the internal key device 130. If an authentication error is recognized the flow proceeds to block 514 and proceeds as described above.

If an authentication error is not recognized, the flow proceeds to block 520. At block 520, the internal key device 130 grants access to the protected device 110 to generate test-results data responsive to receiving the test-request data and the current cipher word. The internal key device 130 enables access to the protected device 110, such as a protected JTAG chain, for each access that is preceded by the correct encrypted data stream or cipher word. The internal key device 130 sends the test-request data to the protected device 110 via the interface 136. The protected device 110 performs the requested test and generates test-results data. The test-results data is output from the protected device 110 to the internal key device 130 via the interface 136. The data is communicated between the protected device 110 and the internal key device 130 via electrical and/or electro-optical connections.

At block 522, the internal key device 130 encodes the test-results data according to the encryption protocol used by the internal key device 130 and the external key device 140.

Block 524 is optional. At block 524, the internal key device 130 communicates the current synchronized cipher word from the internal key device 130 to the external key device 140 when the test data output connection 124 is idle responsive to receiving the test-request data. No clock delays are introduced in the data communication stream related to other functions of the JTAG access.

At block 526, the internal key device 130 communicates the encoded test-results data to the external key device 140 when the TDO connection 124 of the test access port is in the "TDI/TDO active" state responsive to receiving the cipher word and the test-request data. The test access port 124 is in the "TDI/TDO active" state when the TDO connection 124 is in one of a shift-IR state or a shift-DR state The flow proceeds to "D" in the flow diagram 400 of FIG. 4 and to block 416 of FIG. 4. At block 416, the external key device 140 receives the encoded test-results data communicated from the protected device 110 via the internal key device 130 during one of a shift-IR state or a shift-DR state responsive to communicating the cipher word and the test-request data. Block 418 is implemented only if block 524 (FIG. 5) was implemented. At block 418, the external key device 140 receives the current cipher word when the test data output connection 124 is idle.

At block 420, the external key device 140 decodes the communicated test-request data. At block 422, the external key device 140 sends the decoded test-results data to test equipment 200. At block 424, the external key device 140 determines if a termination command is received. In one implementation of this embodiment, the termination command is sent from the test equipment 200. In another implementation of this embodiment, termination command is input by a user to a termination input port at the external key device 140. If it is determined that a termination command has not been received, the flow proceeds to block 414 and additional test-request data is submitted to the internal key device 130.

If it is determined that a termination command has been received, the flow proceeds to block 426. At block 426, the internal key device 140 inverts bits in the current cipher word for n-consecutive clocks responsive to the termination command. An inverted cipher word is an indicator to the internal key device 130 that a termination command was received at the external key device 140. In one implementation of this embodiment, the indication of a termination command is implemented without the inverts bits in the current cipher word. In another implementation of this embodiment, the n-consecutive clocks are supplied by an oscillator in the external key device 140 and not the JTAG clocks supplied by the JTAG test equipment. At block 428, the external key device 140 communicates the inverts bits in the current cipher word to the internal key device 130.

The flow proceeds to block 430 and to "C" in the flow diagram 500 of FIG. 5. From "C" in flow diagram 500, the flow proceeds to block 510. As described above, after the internal key device 130 receives the inverted cipher word (block 510), the internal key device 130 determines the received current cipher word is inverted (block 512) and proceeds to terminate communication of the test-results data to the external key device 130 (blocks 514-516).

At block 430 in FIG. 4, the external key device 140 terminates synchronizing of the cipher word. At block 432, the external key device 140 terminates the communication of the test-results data to the test equipment 200. The flow proceeds to block 404 where the external key device 140 checks for a new test-request data before going into the idle state at block 402.

In this manner, systems 10-13 of FIGS. 1A-1C and 2 are able to use a key exchange protocol to determine if test equipment 200 is authorized to access a protected device 110, to receive test-results data from the protected device 100 at an internal key device 130, to encrypt the test-results data and to communicate the encrypted test-results data to an external key device 140 based on the determination that the test equipment 200 is authorized to access the protected device 110. The systems 10-13 of FIGS. 1A-1C and 2 are also able to terminate communication to the internal key device 130. The systems 10-13 of FIGS. 1A-1C and 2 are also able to terminate communication from the external key device 140.

Figure 6:
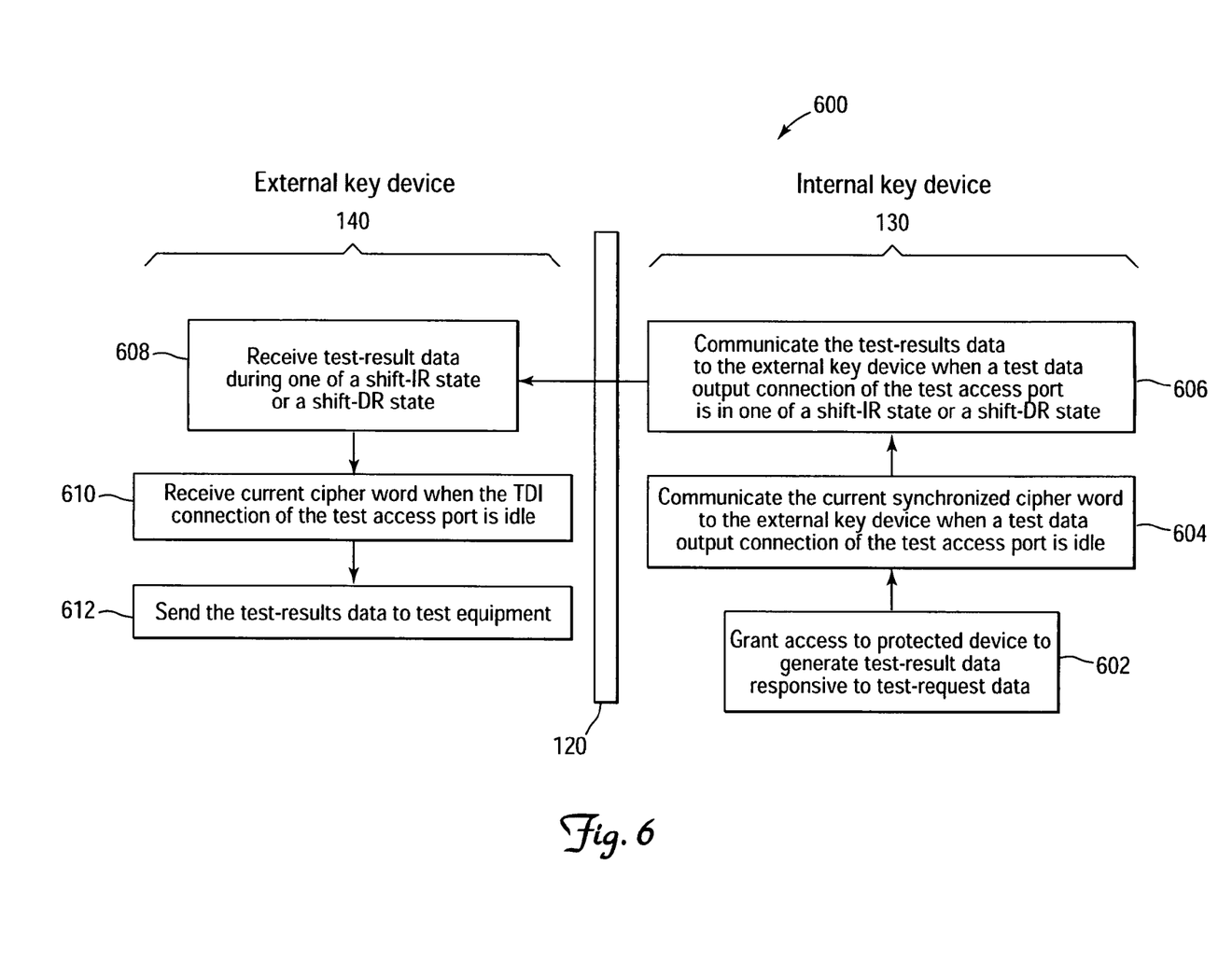
FIG. 6 is a flow diagram of portions of an embodiment of a method to control access to a protected device.

FIG. 6 is a flow diagram 600 of portions of an embodiment of a method to control access to a protected device 110. The particular portions of an embodiment of flow diagram 600 shown in FIG. 6 describe functions related to both the external key device 140 (generally indicated on the right side of the test access port 120 in FIG. 6) and the internal key device 130 (generally indicated on the left side of the test access port 120 in FIG. 6). The flow diagram 600 includes blocks 602-606 that are insertable in flow diagram 500 of FIG. 5 in place of blocks 520-526. The flow diagram 600 includes blocks 608-612 that are insertable in flow diagram 400 of FIG. 4 in place of blocks 416-422. When this suggested replacement of blocks is implemented upon flow diagrams 400 and 500, the resultant flow diagrams describe a method to access a protected device 200 through a test access port 120 in which the test-results data is not encrypted in the internal key device 130 before being sent to the external key device 140 via the TDO connection 124.

The internal key device 130 and the external key device 140 include program instructions, embodied on a storage medium, that are operable to cause a programmable processor to perform the operations described with reference to flow diagram 600. The encryption techniques for this method are as described above with reference to FIGS. 4 and 5.

At block 602, the internal key device 130 grants access to the protected device 110 in order to generate test-results data as described above with reference to block 520 in FIG. 5. Block 604 is optional. At block 604, the internal key device 130 communicates the current synchronized cipher word to the external key device 140 when the test data output connection 124 is idle in response to receiving the test-request data. No clock delays are introduced in the data communication stream related to other functions of the JTAG access. At block 606, the internal key device 130 communicates the un-encoded test-results data to the external key device 140 when a test data output connection of the test access port 124 is in one of a shift-IR state or a shift-DR state.

At block 608, the external key device 140 receives the test-results data communicated from the protected device 110 via the internal key device 130 during one of a shift-IR state or a shift-DR state responsive to communicating the cipher word and the test-request data. Block 610 is implemented if block 604 was implemented. At block 610, the external key device 140 receives the current cipher word when the test data output connection 124 is idle. At block 612, the external key device 140 sends the test-results data to test equipment 200.

Figure 7:
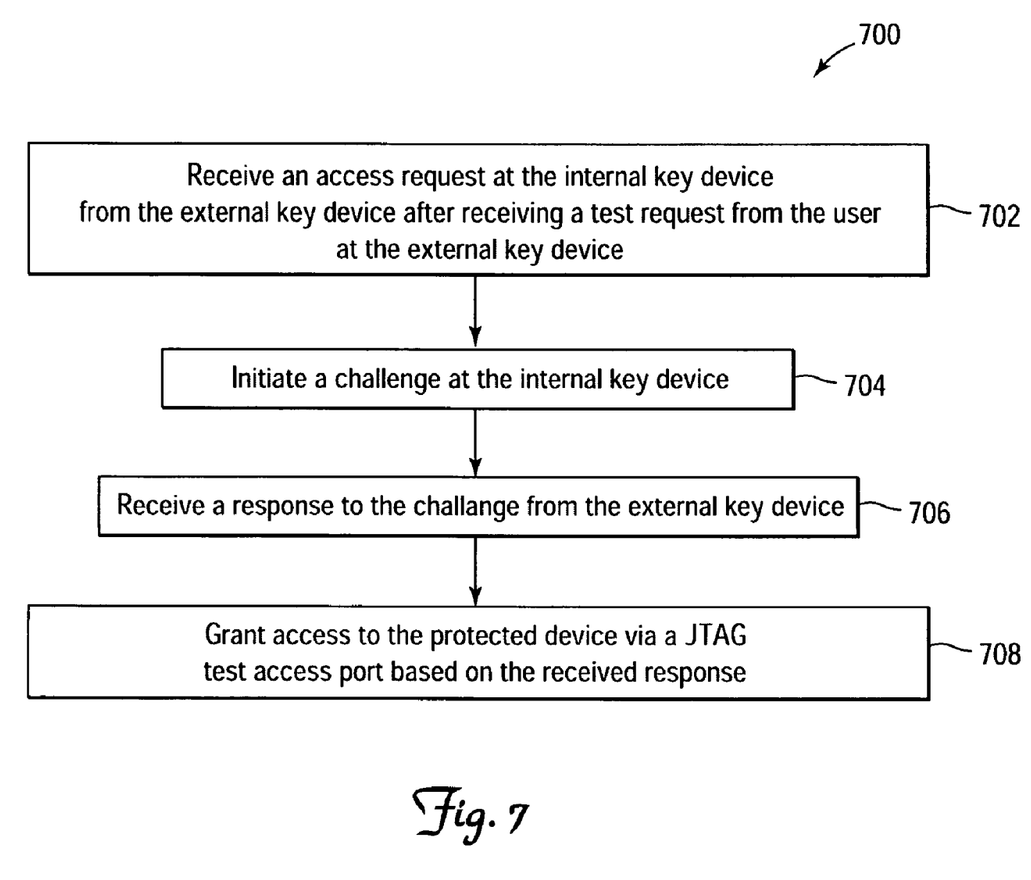
FIG. 7 is a flow diagram of one embodiment of a method to control access to a protected device through a joint test access group (JTAG) test access port.

FIG. 7 is a flow diagram 700 of one embodiment of a method to control access to a protected device 110 through a joint test access group (JTAG) test access port 220 (FIG. 2). In this implementation, the test access port is a JTAG port, the test equipment is JTAG equipment. The internal key device 130 and the external key device 140 include program instructions, embodied on a storage medium, that are operable to cause a programmable processor to perform the operations described with reference to flow diagram 700. The encryption techniques for this method are as described above with reference to FIGS. 2, 4 and 5. In this implementation, after the internal key device 130 receives the correct cipher word, an exchange of test-request data and test-results data via the JTAG test access port 220 is allowed according to the Institute of Electrical and Electronics Engineers (IEEE) 1149.1 and IEEE 1532 standards.

At block 702, the internal key device 130 receives an access request from the external key device 140 after receiving a test request from the user at the external key device 140. The external key device 140 generates the access request and sends it to the internal key device 130 in response to receiving the test request from the user.

At block 704, the internal key device 130 initiates a challenge to the external key device 140. The challenge is provided to the external key device 140. To initiate the challenge, the internal key device 130 generates a random word and communicates the random word to the external key device 140 as described above with reference to block 506 of flow diagram 500 in FIG. 5. The internal key device 130 also loads the random word and generates synchronized cipher words based on the secret password and the initial random word as described above with reference to block 508 of flow diagram 500 in FIG. 5.

At block 706, the internal key device 130 receives a response to the challenge from the external key device 140. The external key device 140 generates a response by loading the random word and generating synchronized cipher words as described above with reference to block 410 in flow diagram 400 of FIG. 4. The external key device 140 communicates a current cipher word to the internal key device 130 when the test data input (TDI) connection 122 of the test access port 120 is idle as described above with reference to block 414 in flow diagram 400 of FIG. 4. The internal key device 130 receives the cipher word generated by the external key device 140 when a test data input connection 122 of a joint test access group (JTAG) test access port 220 is idle.

The internal key device 130 determines the cipher word is authentic, as described above with reference to block 518 of flow diagram 500 in FIG. 5, wherein access is granted to the protected device 110 based on the authentic cipher word. In one implementation of this embodiment, an authentication error is recognized when the cipher word received from the external key device 140 is not synchronized with the cipher word generated in the internal key device 130. If an authentication error is recognized, the internal key device 130 does not allow JTAG test equipment 200 with access to the protected device 110 via the JTAG test access port 120.

If an authentication error is not recognized, the flow proceeds to block 708.

At block 708, the internal key device 130 grants access to the protected device 110 via a joint test access group (JTAG) test access port 220 (FIG. 2) based on the received response. After the internal key device 130 receives the correct response to the challenge, an exchange of test-request data and test-results data is allowed between the JTAG test equipment 200 and the protected JTAG device(s) via the external key device 140, JTAG test access port 220, and internal key device according to the Institute of Electrical and Electronics Engineers (IEEE) 1149.1 and/or IEEE 1532 standards.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to control access to a protected device, the system comprising:
    a test access port operable to communicatively couple with a removable external key device; and
    an internal key device operable to:
        generate at least one random number;
        generate a first plurality of cipher words in response to the at least one random number;
        communicate the at least one random number to the removable external key device;
        receive a second plurality of cipher words from the removable external key device and a plurality of test-request signals, wherein each of the plurality of test-request signals is associated with at least one of the second plurality of cipher words, and wherein each of the second plurality of cipher words is synchronized with a corresponding cipher word of the first plurality of cipher words and generated in response to the communicated at least one random number; and
        for each respective cipher word of the second plurality of cipher words:
            grant access to at least one of the plurality of test-request signals associated with the respective cipher word of the second plurality of cipher words to input the received at least one of the plurality of test-request signals to the protected device based on comparison of the respective cipher word of the second plurality of cipher words to a synchronized corresponding cipher word of the first plurality of cipher words.

2. The system of claim 1, wherein the removable external key device is operable to transmit the second plurality of synchronized cipher words and the plurality of test-request signals when communicatively coupled with the test access port.

3. The system of claim 2, wherein the removable external key device comprises:
    an external test access port controller;
    a security algorithm operable to initiate a synchronous cipher word generation with the internal key device, and wherein the internal key device comprises:
        an internal test access port controller; and
        a security algorithm operable to generate the first plurality of cipher words synchronously with the external key device.

4. The system of claim 1, wherein the test access port comprises:
    a test clock connection to communicate a clock signal;
    a test mode select connection to communicate a signal enabling a test of the protected device;
    a test data input connection to communicate the plurality of test-request signals, a synchronization initiating sequence of data, and the second plurality of cipher words to the internal key device; and
    a test data output connection to communicate the at least one random number and test-results data from the internal key device.

5. The system of claim 4, wherein test-results data are encoded by the internal key device and decoded by the removable external key device.

6. The system of claim 1, wherein the second plurality of cipher words is generated in parallel and subsequently serialized to be transmitted through the test access port.

7. The system of claim 1, wherein the test access port is one of a JTAG port or a multi-wire serial port.

8. The system of claim 1, wherein the test access port is a JTAG port, the plurality of test-request signals are generated by JTAG test equipment, and the removable external key device is communicatively coupled to the protected device according to IEEE 1149.1 standards via the test access port.

9. The system of claim 8, wherein the removable external key device is further communicatively coupled to the internal key device according to IEEE 1532 standards.

10. A method to control access to a protected device through a test access port, the method comprising:
communicating a sequence of data to an internal key device via the test access port;
receiving at least one random number from the internal key device responsive to the sequence of data;
generating a second plurality of cipher words at an external key device responsive to receiving the at least one random number; and
for each respective cipher word of the generated second plurality of cipher words:
(a) communicating a test request to the internal key device when a test data input connection of the test access port is idle, wherein the test request is associated with the respective cipher word of the generated second plurality of cipher words and test-request data; and
(b) receiving test-results data communicated from the protected device via the internal key device responsive to the internal key device granting access for the test request and based on a comparison of the respective cipher word of the generated second plurality of cipher words to a corresponding synchronized cipher word of a first plurality of cipher words of the internal key device.

11. The method of claim 10, the method further comprising:
generating the at least one random number at the internal key device responsive to receiving the sequence of data;
generating the first plurality of cipher words of the internal key device at the internal key device responsive to the internal key device generating the at least one random number;
receiving the test request at the internal key device from the external key device;
encoding the test-results data at the internal key device; and
communicating the encoded test-results data from the internal key device to the external key device when a test data output connection of the test access port is in one of a shift-IR state or a shift-DR state;
decoding the communicated test-results data at the external key device; and
sending the decoded test-results data to test equipment from the external key device.

12. The method of claim 11, the method further comprising:
communicating the encoded test-results data from the internal key device to the external key device when the test data output connection is idle.

13. The method of claim 10, the method further comprising:
generating the at least one random number at the internal key device responsive to receiving the sequence of data;
generating the first plurality of cipher words at the internal key device responsive to receiving the sequence of data;
receiving the respective cipher word of the generated second plurality of cipher words and the test-request data from the external key device;
communicating the test-results data from the internal key device to the external key device when a test data output connection of the test access port is in one of a shift-IR state or a shift-DR state; and
sending the test-results data from the external key device to test equipment.

14. The method of claim 13, the method further comprising:
communicating a cipher word of the first plurality of cipher words from the internal key device to the external key device when the test data output connection is idle responsive to receiving the test-request data.

15. The method of claim 10, the method further comprising:
terminating communication of the second plurality of cipher words and the test-request data.

16. The method of claim 15, wherein the terminating the communication comprises:
receiving a termination command at the external key device;
inverting bits in the respective cipher word of the second plurality of cipher words responsive to the termination command; and
communicating the inverted bits in the respective cipher word of the second plurality of cipher words from the external key device to the internal key device.

17. The method of claim 16, wherein the terminating the communication further comprises:
recognizing an authentication error of the respective cipher word of the second plurality of cipher words at the internal key device.

18. A method to control access to a protected device through a joint test access group (JTAG) test access port, the method comprising:
initiating a challenge at an internal key device;
receiving a response to the challenge from an external key device; and
granting access to the protected device via the JTAG test access port based on the received response,
wherein initiating the challenge comprises:
generating a random number at the internal key device,
generating a first plurality of cipher words at the internal key device responsive to generating the random number,
communicating the random number to the external key device, and
generating a second plurality of cipher words synchronized to the first plurality of cipher words generated at the internal key device at the external key device responsive to receiving the random number, and
wherein receiving the response to the challenge comprises:
for each cipher word of the second plurality of synchronized cipher words:
(a) receiving a respective cipher word of the second plurality of cipher words generated by the external key device when a test data input connection of the JTAG test access port is idle,
(b) determining that the received respective cipher word of the second plurality of cipher words is authentic at the internal key device, and
(c) indicating accessibility of the protected device to a user to input a test-request signal associated with the received respective cipher word of the second plurality if cipher words, wherein the accessibility of the protected device is based on the determination that the received respective cipher word is authentic.

19. A program product comprising program instructions, embodied on a non-transitory storage medium, that are operable to cause a programmable processor to:
generate at least one random number;

generate a first plurality of cipher words in response to the at least one random number;

communicate the at least one random number to a removable external key device;

receive a second plurality of cipher words from the removable external key device and a plurality of test-request signals, wherein each of the plurality of test-request signals is associated with at least one of the second plurality of cipher words, and wherein each of the second plurality of cipher words is synchronized with a corresponding cipher word of the first plurality of cipher words and generated in response to the communicated at least one random number; and for each cipher word of the second plurality of cipher words:

(a) receive a respective cipher word of a second plurality of cipher words generated by the external key device and test-request data, (b) grant access to input the test-request data to a protected device based on the respective cipher word of the first plurality of cipher words and the test-request data, and (c) transmit test-results data based on the test-request data and the granted access to the external key device.

20. The program product of claim 19, further comprising instructions operable to cause the programmable processor to:

receive the respective cipher word of the second plurality of cipher words and the test-request data at an internal key device from the external key device when a test data output connection of a test access port is idle.

21. The program product of claim 19, further comprising instructions operable to cause the programmable processor to:

terminate reception of the respective cipher word of the second plurality of cipher words and the test-request data.

22. A system to protect a device from unauthorized access, the system comprising:

means to use a key exchange protocol to determine if test equipment is authorized to access a protected device including:

means for generating at least one random number;

means for generating a first plurality of cipher words in response to the at least one random number;

means for communicating the at least one random number to a removable external key device; and means for, for each cipher word of a second plurality of cipher words generated at the external key device based on a generated random number:

receiving a respective cipher word of the second plurality of cipher words and test-request data from the external key device; and granting access to input the test-request data to a protected device based on a comparison of the respective cipher word of the second plurality of cipher words to a cipher word of the first plurality of cipher words of an internal key device and the test-request data;

means for receiving test-results data from the protected device at the internal key device;

means for encrypting the test-results data;

means for communicating the encrypted test-results data to the external key device; and means for securing the protected device and the internal key device from tampering.

23. The system of claim 22, further comprising:

means to terminate communication to the internal key device.

24. The system of claim 22, further comprising:

means to terminate communication from the external key device.

* * * * *

UNITED STATES PATENT AND TRADEMARK OFFICE
CERTIFICATE OF CORRECTION

PATENT NO.        : 8,171,542 B2                                                         Page 1 of 1
APPLICATION NO.   : 11/352539
DATED             : May 1, 2012
INVENTOR(S)       : James L. Tucker It is certified that error appears in the above-identified patent and that said Letters Patent is hereby corrected as shown below:

Column 14, line 43, claim 3, "the external" should read --the removable external--

Column 14, line 57, claim 5, "wherein test-results" should read --wherein the test-results--

Column 14, line 66, claim 8, "plurality of test-request signals" should read --plurality of request signals--

Signed and Sealed this
Eighteenth Day of December, 2012

David J. Kappos
*Director of the United States Patent and Trademark Office*